（12） United States Patent
Dokhon et al.

(10) Patent No.: US 11,685,857 B2
(45) Date of Patent: Jun. 27, 2023

(54) METHOD OF EVALUATING SURFACTANTS FOR ENHANCED OIL RECOVERY

(71) Applicant: SAUDI ARABIAN OIL COMPANY, Dhahran (SA)

(72) Inventors: Waleed Abdulaziz Dokhon, Ulaya Khobar (SA); Abdulkareem M. Alsofi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/321,191

(22) Filed: May 14, 2021

(65) Prior Publication Data

US 2022/0363978 A1 Nov. 17, 2022

(51) Int. Cl.
*C09K 8/584* (2006.01)
*C09K 8/80* (2006.01)
*C09K 8/88* (2006.01)

(52) U.S. Cl.
CPC ............. *C09K 8/584* (2013.01); *C09K 8/882* (2013.01)

(58) Field of Classification Search
None
See application file for complete search history.

(56) References Cited

U.S. PATENT DOCUMENTS

| | | | |
|---|---|---|---|
| 5,301,539 A | 4/1994 | Schramm et al. | |
| 7,963,329 B2 * | 6/2011 | Shahin | C09K 8/584 166/305.1 |
| 9,422,470 B2 | 8/2016 | Xu et al. | |
| 9,869,624 B2 | 1/2018 | Szabo et al. | |

(Continued)

FOREIGN PATENT DOCUMENTS

| | | |
|---|---|---|
| CN | 205138957 U | 4/2016 |
| CN | 103940706 B | 5/2016 |

(Continued)

OTHER PUBLICATIONS

Al-Murayri, M. T. et al., "Surfactant/Polymer Flooding: Chemical-Formulation Design and Evaluation for Raudhatain Lower Burgan Reservoir, Kuwait" SPE Res Eval & Eng, vol. 22, Issue 03, Paper No. SPE-183933-PA, 2019 (18 pages).

Tagavifar, M. et al., "Dynamics of Low-Interfacial-Tension Imbibition in Oil-Wet Carbonates" SPE Journal, vol. 24, Issue 03, Paper No. SPE-194194-PA, 2019 (16 pages).

(Continued)

*Primary Examiner* — Charles R Nold
(74) *Attorney, Agent, or Firm* — Osha Bergman Watanabe & Burton LLP

(57) ABSTRACT

A method of evaluating a surfactant is provided. The method includes preparing a first emulsion comprising an aqueous phase, an oleaginous phase, and a first surfactant. Then the method includes determining an average droplet size of oleaginous phase droplets in the first emulsion. The method then includes preparing a second emulsion comprising the aqueous phase, the oleaginous phase, and a second surfactant, and then determining an average droplet size of oleaginous phase droplets in the second emulsion. After determining droplet sizes of both emulsions, the method includes comparing the average droplet size of the of the oleaginous phase droplets in the first emulsion to the average droplet size of the oleaginous phase droplets in the second emulsion, and based on the comparing of the average droplet sizes, determining a relative interfacial tension of the first surfactant as compared to the second surfactant.

14 Claims, 3 Drawing Sheets

(56) References Cited

U.S. PATENT DOCUMENTS

| | | | |
|---|---|---|---|
| 10,545,080 B2 | 1/2020 | Clarke et al. | |
| 2006/0014650 A1* | 1/2006 | Campbell | C09K 8/584 |
| | | | 166/305.1 |
| 2015/0184063 A1* | 7/2015 | Gutierrez Santana | C09K 8/584 |
| | | | 166/305.1 |
| 2018/0327651 A1 | 11/2018 | Piri et al. | |

FOREIGN PATENT DOCUMENTS

| | | |
|---|---|---|
| CN | 105181532 B | 10/2017 |
| CN | 109580417 A | 4/2019 |
| GB | 2271593 A | 4/1994 |
| JP | 6724221 B1 | 7/2020 |
| WO | 2013039980 A1 | 3/2013 |
| WO | 2016093818 A1 | 6/2016 |

OTHER PUBLICATIONS

Achinta Bera et al., "Screening of microemulsion properties for application in enhanced oil recovery", Fuel, vol. 121, Apr. 2014, pp. 198-207 (10 pages).

Herd, MD et al., "Measurement of Interfacial Tension by Use of Pendant Drop Video Techniques", Topical Report, OSTI Identifier: 10192746, Sep. 1993 (72 pages).

Chen, Y et al., "Size dependent droplet interfacial tension and surfactant transport in liquid-liquid systems, with applications in shipboard oily bilgewater emulsions", Soft Matter, 2020, 16, The Royal Society of Chemistry, Feb. 18, 2020, pp. 2994-3004 (11 pages).

International Search Report issued in corresponding International Application No. PCT/US2022/028984, dated Oct. 4, 2022 (3 pages).

Written Opinion issued in corresponding International Application No. PCT/US2022/028984, dated Oct. 4, 2022 (5 pages).

\* cited by examiner

METHOD OF EVALUATING SURFACTANTS FOR ENHANCED OIL RECOVERY

BACKGROUND

During primary oil recovery, oil inside an underground hydrocarbon reservoir is driven to the surface (for example, toward the surface of an oil well) by a pressure difference between the reservoir and the surface. However, only a fraction of the oil in an underground hydrocarbon reservoir can be extracted using primary oil recovery. Thus, a variety of techniques for enhanced oil recovery are utilized after primary oil recovery to increase the production of hydrocarbons from hydrocarbon-bearing formations. Some examples of these techniques include water flooding, chemical flooding, and gas flooding.

Surfactants are widely used in enhanced oil recovery processes for their ability to reduce interfacial tension between oil and water and increase the viscosity of the displacing fluid or gas. Surfactants that provide an ultralow interfacial tension may increase the amount of oil recovered in enhanced oil recovery processes. However, techniques for determining the utility of a surfactant in enhanced oil recovery applications can be complicated.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed herein relate to a method of evaluating a surfactant. The method includes preparing a first emulsion comprising an aqueous phase, an oleaginous phase, and a first surfactant. Then, the method includes determining an average droplet size of oleaginous phase droplets in the first emulsion. The method then includes preparing a second emulsion comprising the aqueous phase, the oleaginous phase, and a second surfactant, and then determining an average droplet size of oleaginous phase droplets in the second emulsion. After determining droplet sizes of both emulsions, the method includes comparing the average droplet size of the of the oleaginous phase droplets in the first emulsion to the average droplet size of the oleaginous phase droplets in the second emulsion, and based on the comparing of the average droplet sizes, determining a relative interfacial tension of the first surfactant as compared to the second surfactant.

Other aspects and advantages of the claimed subject matter will be apparent from the following description and the appended claims.

DETAILED DESCRIPTION

The present disclosure generally relates to methods of evaluating surfactants for use in enhanced oil recovery applications. An important property of surfactants used in enhanced oil recovery is the interfacial tension (IFT) provided between oil and water phases in a reservoir. Interfacial tension is a measure of the Gibbs free energy per unit area of the interface between two immiscible phases (e.g., oil and water) at a fixed temperature and pressure. The high interfacial tension between oil and water leads to low oil recovery for water flooding processes. This interfacial tension can be lowered by using surfactants. Thus, surfactants that provide ultralow IFT values can improve oil recovery efficiency.

Tensiometry tests are commonly used to determine the IFT provided by various surfactants. While such tests may provide useful data regarding IFT values, they tend to be cumbersome and time consuming. Quick screening methods for determining the relative IFT provided by various surfactants are needed for surfactant development and enhanced oil recovery.

Figure 1:
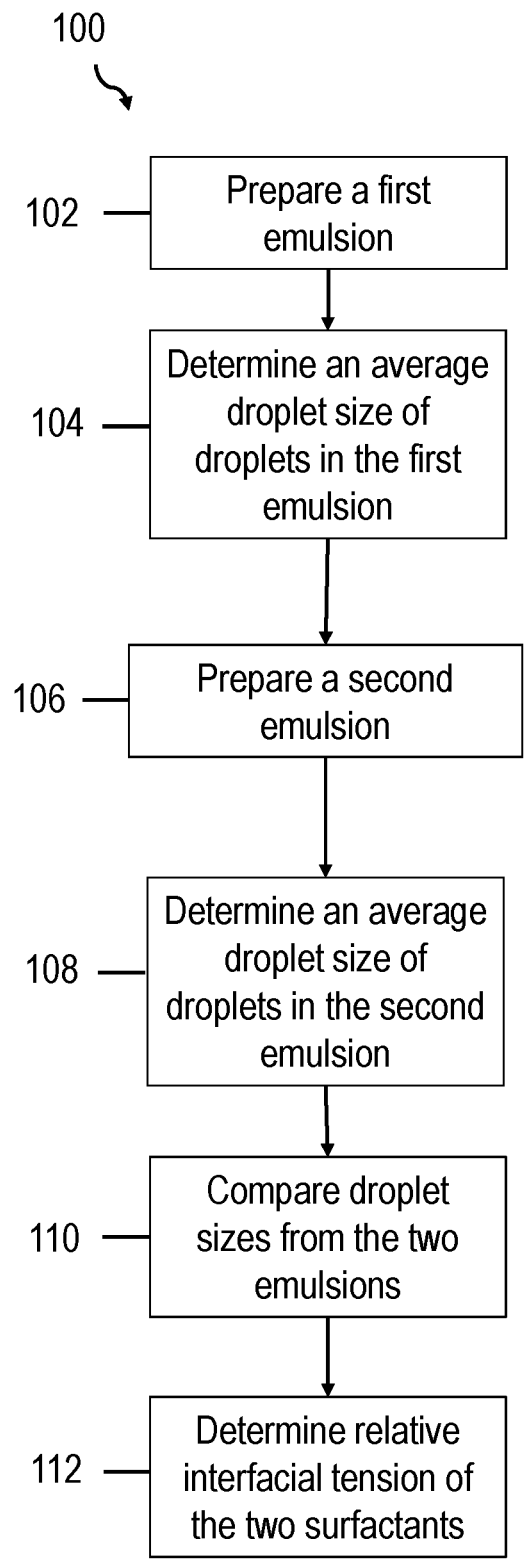
FIG. 1 is a block flow diagram of a method in accordance with one or more embodiments.

The present disclosure relates to a method of evaluating surfactants. A method in accordance with one or more embodiments is shown in FIG. 1. The method 100 includes a step of preparing a first emulsion 102. The emulsion includes an aqueous phase an oleaginous phase, and a first surfactant. The method 100 then includes determining an average droplet size of oleaginous phase droplets in the first emulsion 104. Then a second emulsion similar to the first emulsion is prepared 106. The second emulsion includes the same aqueous phase and oleaginous phase as the first emulsion, and a second surfactant. The average droplet size of oleaginous phase droplets in the second emulsion is then determined 108. Once droplet sizes of both emulsions have been determined, the average droplet sizes are compared 110. Finally, based on the comparison of the average droplet sizes, the relative interfacial tension of the first surfactant as compared to the second surfactant is determined 112.

Embodiments disclosed herein describe a method of evaluating surfactants. Embodiment methods describe analyzing a first surfactant and a second surfactant. However, as will be understood by those skilled in the art, any number of surfactants may be evaluated using the disclosed method. In each emulsion used in the disclosed method, the aqueous and oleaginous phases are the same, meaning the type and quantity of each phase in the emulsion is kept constant across multiple emulsions in the disclosed method. The comparison of average particle size of various emulsions is conducted under identical conditions, meaning the composition and preparation of the emulsions is kept constant, while the type of surfactant to be evaluated is varied between samples. Differences in the oleaginous phase droplet size provide a relative measure of IFT for different surfactants.

As previously described, methods disclosed herein include preparing an emulsion. The emulsion includes an aqueous phase. For embodiment emulsions, the aqueous phase includes water. The water may comprise one or more known compositions of water, including distilled; condensed; filtered or unfiltered fresh surface or subterranean waters, such as water sourced from lakes, rivers or aquifers; mineral waters; gray water; run-off, storm or waste water; potable or non-potable waters; brackish waters; synthetic or natural sea waters; synthetic or natural brines; formation waters; production water; and combinations thereof. The first and second emulsions described herein include an equal amount of the same aqueous phase when used in the disclosed method.

Emulsions disclosed herein also include a surfactant. The surfactant may be any surfactant potentially useful in enhanced oil recovery applications. The surfactant may be non-ionic, cationic, anionic, zwitterionic, catanionic, gemini and combinations thereof.

The surfactant may be present in the emulsion in a suitable quantity to form a stable emulsion. The concentration of the surfactant may be from about 0.1% to about 0.5 wt. % (weight percent) based on the amount of the aqueous phase. The concentration of the surfactant may be about 0.1, 0.2, 0.3, 0.4 or 0.5 wt. % based on the amount of the aqueous phase. As may be appreciated by those skilled in the art, the quantity of surfactant may be modified based upon the quantity and type of the oleaginous phase so that a stable emulsion can be formed.

Emulsions in accordance with the present disclosure include an oleaginous phase. The oleaginous phase may include crude oil, condensates, light hydrocarbon liquids, fractions thereof, and derivatives thereof. In some embodiments, the oleaginous phase may include hydrocarbons from a specific hydrocarbon-bearing formation. In such embodiments, the disclosed methods may be used to select an optimal surfactant for a particular mixture of hydrocarbons present in a hydrocarbon-bearing formation. As previously described quantity and type of the oleaginous phase in each emulsion being tested is equal.

Emulsions in accordance with the present disclosure may include an appropriate ratio of oil to water to achieve an emulsion. The ratio of the aqueous phase to the oleaginous phase may be about 90:10; 80:20; 70:30; 60:40; 50:50; 40:60; 30:70; 20:80 or 10:90 by volume. Thus, emulsions disclosed herein may include from about 10 to 90% by volume of the aqueous phase and from about 10 to 90% by volume of the oleaginous phase. In embodiments including a lower relative amount of water, it may be more difficult to form the emulsion. In such embodiments, additional agitation, as discussed below, may be needed to form the emulsion. As discussed previously, the ratio of the aqueous phase to the oleaginous phase must be constant for all samples being compared in the disclosed method.

In one or more embodiments, in order to prepare an emulsion, the previously described aqueous phase, oleaginous phase and surfactant are combined and agitated to form an oil-in-water emulsion. The components of the emulsion may be agitated, for example by stirring, to prepare the emulsion. Stirring may be conducted at a stirring speed ranging from around 200 rpm (revolutions per minute) to about 2500 rpm for about 10 to 30 minutes to prepare an emulsion in accordance with one or more embodiments. In particular embodiments, the agitation may include stirring at 650 rpm for about 10 minutes. As will be appreciated by those skilled in the art, the agitation may be appropriately adjusted to provide a stable emulsion based upon the quantity and type of aqueous and oleaginous phases.

After preparing an emulsion, in one or more embodiments, an average droplet size of oleaginous phase droplets in the emulsion may be determined. The average droplet size may be determined by any suitable particle size analysis method, such as voltage pulse analysis or dynamic light scattering. Any suitable average measurement, such as median or mode, may be determined. In one or more embodiments, the mode may be used to compare droplet sizes of the emulsions.

Once the average droplet sizes of the various emulsions, for example a first emulsion and a second emulsion, have been determined, the average droplet sizes of the oleaginous phases are compared for each emulsion. The measured droplet sizes for each emulsion are compared to determine a ranking of average droplet sizes. The average droplet sizes may be compared to determine a ranking from largest to smallest average droplet size.

In one or more embodiments, the average droplet size measured in the emulsion may be indicative of the relative interfacial tension of the surfactants. For example, surfactants in emulsions having lower droplet sizes correspond to surfactants having lower IFT values relative to the other surfactants tested. Thus, prior to performing a conventional IFT test, such as a spinning drop tensiometry test, a variety of surfactants may be compared to one another to determine surfactants having the lowest IFTs in the group of surfactants tested. As such, based on the comparison of the average droplet sizes in different emulsions, the relative interfacial tensions of the surfactants may be determined.

Once the relative interfacial tension values of the surfactants have been determined, in one or more embodiments, an interfacial tension test may be performed on the surfactant(s) having the lower relative interfacial tension value(s). In one or more embodiments, the interfacial tension test may be a spinning drop tensiometry test.

In one or more embodiments, after performing the previously described interfacial tensions test, a surfactant having an appropriately low interfacial tension may be used to treat a hydrocarbon-bearing formation. In one or more embodiments, the using may comprise introducing an oil recovery composition comprising the surfactant into a hydrocarbon-bearing formation. Oil recovery compositions in accordance with the present disclosure may be any type of oil recovery composition that includes a surfactant. In one or more embodiments, the oil recovery composition comprising the surfactant may be an aqueous composition for use in water flooding. In such embodiments, the surfactant may be mixed with an aqueous component, such as seawater, and then introduced into the hydrocarbon-bearing formation as an aqueous composition.

Figure 2:
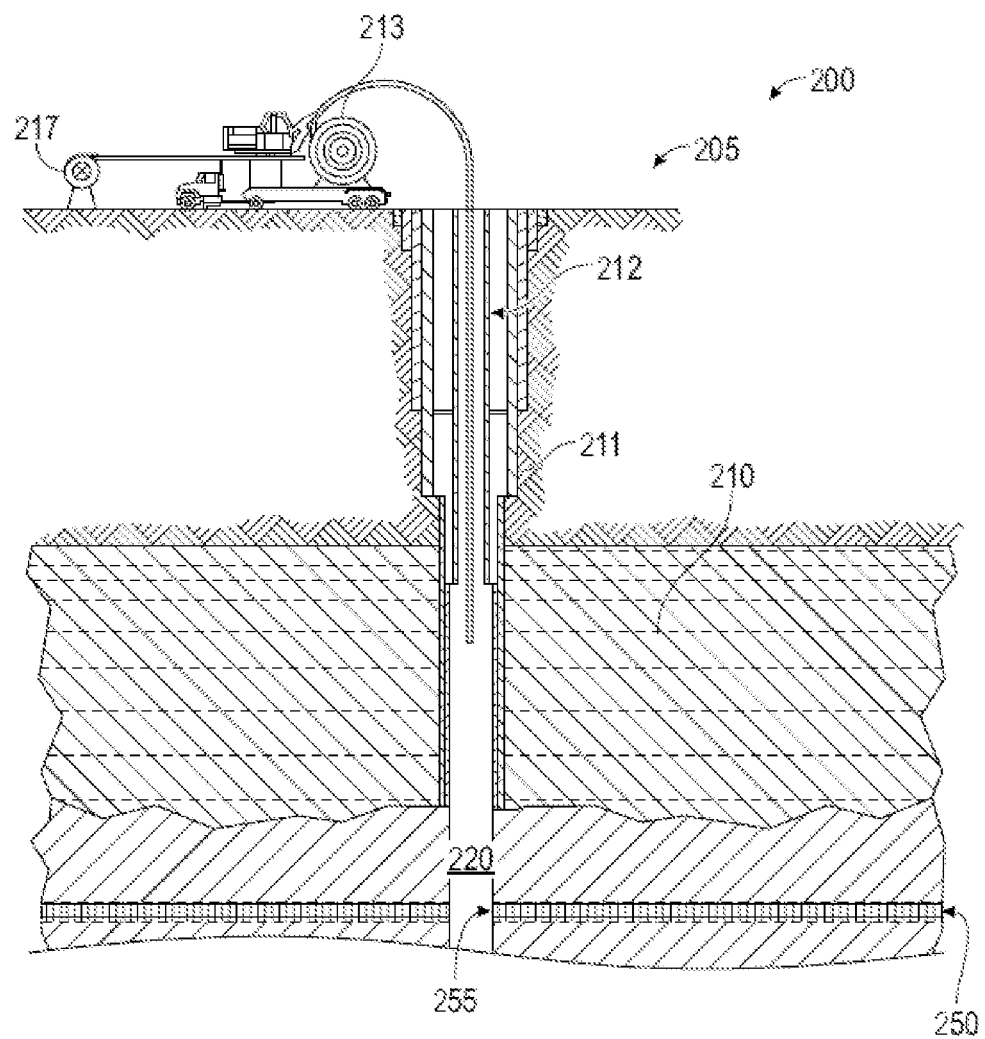
FIG. 2 is a well environment in accordance with one or more embodiments.

FIG. 2 is a diagram that illustrates a well environment 200 in accordance with one or more embodiments. Well environment 200 includes a subsurface 210. Subsurface 210 is depicted having a wellbore wall 211 both extending downhole from a surface 205 into the subsurface 210 and defining a wellbore 220. The subsurface also includes target formation 250 to be treated. Target formation 250 has target formation face 255 that fluidly couples target formation 250 with wellbore 220 through wellbore wall 211. In this case, casing 212 and coiled tubing 213 extend downhole through the wellbore 220 into the subsurface 210 and towards target formation 250. With the configuration in FIG. 2, the previously described oil recovery composition may be introduced into the subsurface 210 and towards target formation 250 via a pump 217 through the coiled tubing 213.

Hydrocarbon-bearing formations may include any oleaginous fluid, such as crude oil, dry gas, wet gas, gas condensates, light hydrocarbon liquids, tars, and asphalts, and other hydrocarbon materials. Hydrocarbon-bearing formations may also include aqueous fluid, such as water and brines. Embodiment oil recovery compositions may be appropriate for use in different types of subterranean formations, such as carbonate, shale, sandstone and tar sands.

Examples

Materials

The particle size analyzer used to measure droplet size in emulsions is a Multisizer 4e Particle Size Analyzer. Ethoquad C/12 (50% purity) and Ethoquad HT25 (50% purity) were obtained from Nouryon Chemicals, and SS887 (32% purity) was obtained from Oil Chem Technologies. Dead oil (API=25.4; density at 100° C.=846.8 kg/m3; viscosity at 100° C.=3.4 mPa.$) and seawater (salinity 55,000 ppm) were used to prepare the emulsions.

Methods:

Three surfactant solutions were prepared in water at a concentration of 0.2 wt. % based on the amount of the aqueous phase. Emulsion 1 was prepared with Ethoquad C/12, emulsion 2 was prepared with Ethoquad HT25 and emulsion 3 was prepared with SS887. Emulsions were prepared by combining a 70:30 water:oil composition by volume for each of the three surfactants and stirring at 650 rpm for about 10 minutes.

Figure 3:
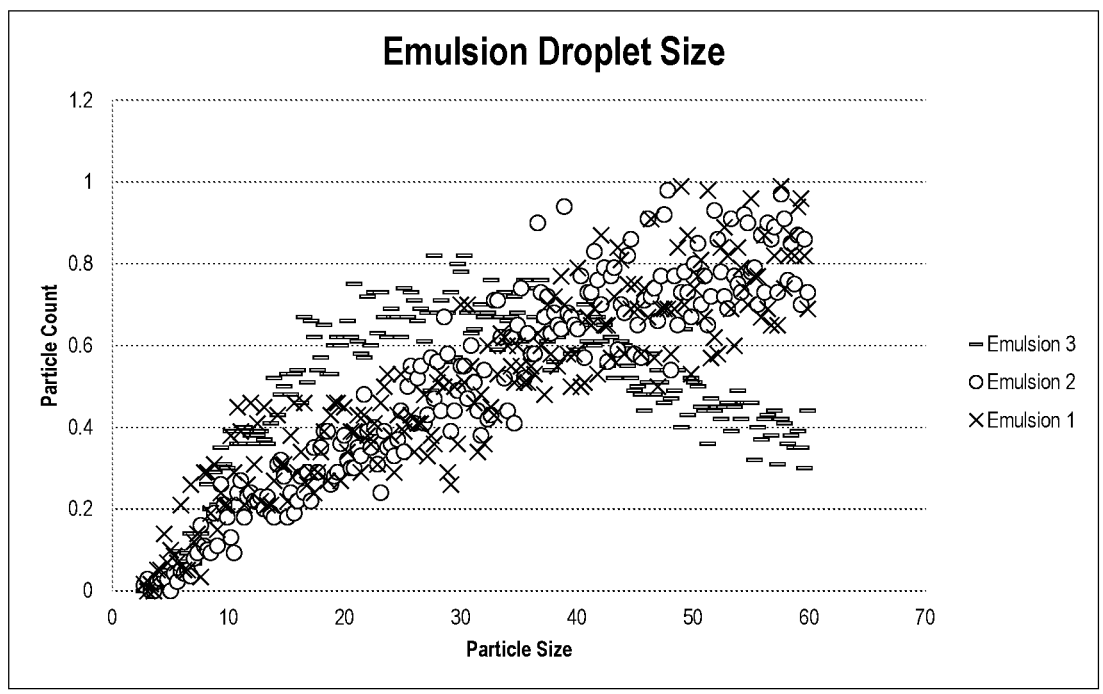
FIG. 3 is a plot showing particle size data for emulsions in accordance with one or more embodiments.

The size of the oil droplets in the emulsion was measured using a Multisizer 4e Particle Size Analyzer with an aperture tube of 100 μm. Each emulsion was stirred at 650 rpm during the measurement. The particle size data for emulsions 1, 2 and 3 was analyzed using Multisizer Courier software and is shown in FIG. 3. Emulsion 3 resulted in a lower particle size as compared to emulsion 1 and emulsion 2, indicating a lower relative IFT for emulsion 3.

Comparative interfacial tension data was collected using a spinning drop tensiometer test. The spinning drop tensiometer test was conducted using a Spinning Drop Tensiometer from KRUSS Scientific. Briefly, the temperature was set to 90° C. and the rotation speed was set to the appropriate speed for the sample. Generally, a rotation speed is selected to achieve an oil droplet length that is four times its width. In this case, the rotation speed was about 4500 rpm. The previously described surfactant solutions were introduced into capillary tubes followed by the introduction of oil by using a syringe to produce an oil drop inside the capillary tube. The capillary was then re-filled with surfactant to avoid air bubble generation during the run. The capillary tube was placed inside the spinning drop tensiometer. The measurement proceeded by slowly accelerating the motor between 3000 and 7000 rpm. When the bubble's length is at least four times its own width the chronometer was started, and the first measurement taken. Measurements of rpm and oil droplet width were taken every 5 minutes for 30 minutes. Vonnegut's equation, shown as Formula (I), was used to calculate the IFT:

$$\gamma = \frac{r^3 \cdot \omega^2 \cdot \Delta\rho}{4} \qquad \text{Formula (I)}$$

where γ is IFT, r is the droplet diameter, w is the frequency of rotation, and Δρ is density difference. The data obtained for the surfactants used in emulsions 1, 2 and 3 is shown in Table 1.

TABLE 1

| Surfactant | IFT (mN/m) |
|---|---|
| 1 | 1.13 |
| 2 | 1.77 |
| 3 | 0.053 |

As shown, surfactant 3 has a significantly lower IFT as compared to surfactants 1 and 2.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed:

1. A method of evaluating a surfactant comprising:
    preparing a first emulsion comprising an aqueous phase, an oleaginous phase, and a first surfactant;
    determining an average droplet size of oleaginous phase droplets in the first emulsion;
    preparing a second emulsion comprising the same aqueous phase as the first emulsion, the same oleaginous phase as the first emulsion, and a second surfactant, wherein the first surfactant is different from the second surfactant,
    wherein a concentration of the first surfactant and a concentration of the second surfactant are the same;
    determining an average droplet size of oleaginous phase droplets in the second emulsion;
    comparing the average droplet size of the of the oleaginous phase droplets in the first emulsion to the average droplet size of the oleaginous phase droplets in the second emulsion; and
    based on the comparing of the average droplet sizes, determining a relative interfacial tension of the first surfactant as compared to the second surfactant.

2. The method of claim 1, further comprising:
    after the relative interfacial tension of the first surfactant as compared to the second surfactant as been determined, performing an interfacial tension test on the surfactant having a lower relative interfacial tension.

3. The method of claim 2, further comprising, after performing the interfacial tension test, using the surfactant having the lower relative interfacial tension to treat a hydrocarbon-bearing formation, wherein the using comprises introducing an oil recovery composition comprising the surfactant into the hydrocarbon-bearing formation.

4. The method of claim 2, wherein the interfacial tension test is a spinning drop tensiometry test.

5. The method of claim 1, wherein the first emulsion and the second emulsion comprise equal amounts by volume of the aqueous phase and the oleaginous phase.

6. The method of claim 1, wherein the first surfactant is non-ionic, cationic, anionic, zwitterionic, catanionic, gemini, and combinations thereof.

7. The method of claim 1, wherein the second surfactant is non-ionic, cationic, anionic, zwitterionic, catanionic, gemini, and combinations thereof.

8. The method of claim 1, wherein, in the first emulsion, the aqueous phase comprises from about 0.1 wt. % to about 0.5 wt. % of the first surfactant.

9. The method of claim 1, wherein, in the second emulsion, the aqueous phase comprises from about 0.1 wt. % to about 0.5 wt. % of the second surfactant.

10. The method of claim 5, wherein the first emulsion and the second emulsion comprise from 10 to 90 vol. % of the oleaginous phase.

11. The method of claim 1, wherein the preparing of the first emulsion and the second emulsion comprises stirring the aqueous phase, the oleaginous phase and the surfactant at a speed of from about 200 to 2500 rpm.

12. The method of claim 1, wherein the preparing of the first emulsion and the second emulsion comprises stirring the aqueous phase, the oleaginous phase and the surfactant for a time of from about 10 to 30 minutes.

13. The method of claim 3, wherein the oil recovery composition is an aqueous composition.

14. The method of claim 1, further comprising selecting one of the first or the second surfactant for treating a hydrocarbon-bearing formation having a particular mixture of hydrocarbons based on the relative interfacial tension of the first surfactant as compared to the second surfactant.

* * * * *